United States Patent [19]
DeVane

[11] Patent Number: 5,228,066
[45] Date of Patent: Jul. 13, 1993

[54] SYSTEM AND METHOD FOR MEASURING COMPUTER SYSTEM TIME INTERVALS

[75] Inventor: Charles J. DeVane, Milford, Mass.
[73] Assignee: Digital Equipment Corporation, Maynard, Mass.
[21] Appl. No.: 871,938
[22] Filed: Apr. 22, 1992
[51] Int. Cl.⁵ .............................. G01P 3/489
[52] U.S. Cl. ........................ 377/20; 377/16; 377/44; 377/51
[58] Field of Search ............... 377/20, 16, 44, 51

[56] References Cited

U.S. PATENT DOCUMENTS 4,159,416 6/1979 Brejnik et al. ............... 377/20
4,794,551 12/1988 Yoshida ..................... 377/20
4,841,932 6/1989 Hansen et al. ............... 377/20

Primary Examiner—William L. Sikes
Assistant Examiner—Scott A. Ouellette
Attorney, Agent, or Firm—Kenyon & Kenyon

[57] ABSTRACT

A circuit that may be implemented in a computer system that will measure the maximum and minimum time intervals for system elements to respond to a request for data or information. The circuit includes control logic that controls operation of the circuit, an up-counter and a down-counter that are used together for measuring the maximum or minimum response time interval, and a display for displaying the maximum or minimum response time interval that is measured during a test period.

44 Claims, 4 Drawing Sheets

SYSTEM AND METHOD FOR MEASURING COMPUTER SYSTEM TIME INTERVALS

FIELD OF THE INVENTION

The present invention relates to systems and methods for measuring time intervals that computer system elements require for responding to requests for data or information. More specifically, the present invention relates to systems and methods for measuring the maximum or minimum time interval for computer system elements to respond to requests for data or information.

BACKGROUND OF THE INVENTION

When a new computer system is designed, it must be tested to determine its operating parameters and tolerances. This includes the time intervals it takes system elements to perform assigned tasks and deliver requested data or information to the other system elements or external devices.

One of the items that it is often necessary to empirically measure is the maximum time interval that is required for system elements to respond when addressed. Specifically, in computer systems, the time required for a slave device to respond when addressed by a bus master may vary. It is usually necessary to know the system's "worst case" operating conditions so that other system functions may be determined.

There are three techniques for measuring or estimating the maximum response time for system elements. The first technique involves the use of a logic analyzer. For this purpose, the logic analyzer may be attached to a bus to simply measure the time interval system elements take to respond to a request. In performing this function, the logic analyzer measures the time period from when a system element is granted a bus to when a response is provided and the bus is released. To do this, the logic analyzer monitors the computer system under test and triggers whenever the time interval being measured exceeds a predetermined threshold value. The logic analyzer then determines the actual length of the response time interval, resets the threshold to the new higher measured value, resets the trigger, and monitors the bus for the occurrence of a longer response time interval by a system element.

When a logic analyzer is used in this way, there are several drawbacks. Two of the major ones will now be discussed. First, a logic analyzer is a bulky and expensive piece of laboratory equipment. Accordingly, its use for the purpose of measuring the longest time interval for system elements to respond to requests, for example, from a bus master, is restricted primarily to the laboratory environment. It would be very difficult to move a logic analyzer and use it in the field as is required in many cases when a new computer system is being tested.

Second, a logic analyzer is a device that samples data, for example on a bus, for a certain time period at predetermined intervals. It is not usually run for the entire time a new computer system is tested. When a logic analyzer monitors a bus for the purpose of determining the longest response time for system elements, the actual determination of the longest response time interval usually requires many seconds, and even minutes, because the logic analyzer must first capture the data, and then, off-line, analyze the data to determine if a particular threshold value is surpassed, reset the threshold value if it is surpassed, and reset itself to capture more data because of the storage limitations of logic analyzers. Given that response time intervals can be in the order of nanoseconds, there can be millions of response time intervals occurring during the time the logic analyzer is performing the above-discussed functions off-line and one of these time intervals may be the longest response time interval —which is missed—thereby inaccurate results from the logic analyzer will obtain. To attempt to overcome this problem, logic analyzers monitor a bus for an extended period of time to reduce the probability of missing the longest response time interval. This is a very inefficient use of logic analyzers and is an inefficient method to determine the longest response time interval.

The second technique is directed to the use of a timeout circuit that has a fixed threshold value. The timeout circuit may be easily incorporated into a computer system. This circuit operates such that when the threshold value is exceeded, the circuit causes an indication of same by activating a display. This circuit may be implemented in almost any type of computer system and is not restricted to the laboratory environment like a logic analyzer. The circuit also does not miss any time intervals since it performs real-time monitoring of response time intervals and real-time indications of when a response time interval exceeds the threshold value.

The problem with a timeout circuit is that it does not actually measure the response time interval but merely indicates when a response time interval is longer than the threshold value. At best, this technique only verifies whether a particular response time interval is longer or shorter than the threshold value, nothing more.

The third technique overcomes some of the problems that occur in the first two techniques. This technique also is configured as a circuit that may be implemented as part of a computer system. This circuit, unlike the time-out circuit, actually measures the length of each response time interval and compares it with a value that is loaded in the circuit's register. The value in the register is the longest response time value for a system element that has been measured up to the current time. When a longer response time interval is measured, the circuit loads the new value into the register.

A circuit according to the third technique is shown generally at 100 in FIG. 1. The circuit includes control logic 102 which controls operation of the circuit. The first input to control logic 102 is the INTERVAL signal on line 104. This is asserted when a response time interval begins and de-asserted when a response time interval ends. The second input to control logic 102 is the output of comparator 112 on line 118. This signal will be discussed in detail subsequently.

Control logic 102 has two outputs. The first output on line 106 is to counter 108. This output causes the counter to count upward according to the clock rate once the INTERVAL signal is asserted. The second output from control logic 102 on line 107 is input to register 113. The signal on line 107 is the LOAD VALUE signal which causes register 113 to latch the value that is on line 110.

Counter 108 has two inputs. The first input on line 106, as stated, is from control logic 102 and causes the counter to count upward. The other input on line 109 is the RESET signal that resets the counter after the INTERVAL signal is de-asserted.

The output of counter 108 on line 110 is input to comparator 112 and register 113. The second input to comparator 112 is the output of register 113 on line 114. The output of register 113 on line 114 is the value that is latched in register 113 which is the current longest response time interval that has been measured. The output of register 113 also is input to display 116 which displays the current longest response time interval that has been measured.

The output of comparator 112 on line 118 is asserted when the output of counter 108 on line 110 exceeds the value that is latched in register 113 (and input to the comparator on line 114). When the output of comparator 112 on line 118 is asserted, it causes the control logic to assert the LOAD VALUE signal on line 107, once the INTERVAL signal is de-asserted, to load the new longest response time interval value in register 113.

Once a particular response time interval is over and the old value loaded in register 113 has been exceeded, the INTERVAL signal on line 104 is de-asserted, the new value is loaded into register 113, and the counter is reset by asserting the RESET signal on line 109. The circuit operates in the above-described manner during the test period to determine the longest response time interval for the system elements.

The present invention provides an improved method to measure response time intervals as will be described in the remainder of the specification and with reference to the attached drawings.

SUMMARY OF THE INVENTION

The present invention is a system and method for measuring the response time intervals for elements of a computer system to respond to requests for data or information, for example, from a bus master. This includes measuring the longest (maximum) or shortest (minimum) time interval.

The present invention may be configured as a circuit and incorporated in a computer system without difficulty for measuring the shortest or longest response time interval for system elements. The system of the present invention may be embodied as a circuit that includes control logic that controls operation of the circuit, an up-counter and a down-counter that are used together for measuring the maximum and minimum response time intervals, and a display for displaying the maximum or minimum response time intervals that are measured during a test period.

The operation of the circuit of the present invention involves methods for measuring both the longest and shortest response time intervals for computer system elements. Both methods use each of the circuit components discussed above.

The system and method of the present invention will be explained in greater detail in the remainder of the specification making reference to the attached drawings.

DETAILED DESCRIPTION OF THE PREFERRED EMBODIMENT

The present invention is a system and method for measuring the longest (maximum) or shortest (minimum) time interval for computer system elements to respond to requests for data or information, for example, from a bus master. A response time interval for purposes of the present invention is the period of time that a system element occupies, or has control of, for example, a bus with regard to responding to a request for data or information.

Figure 1:
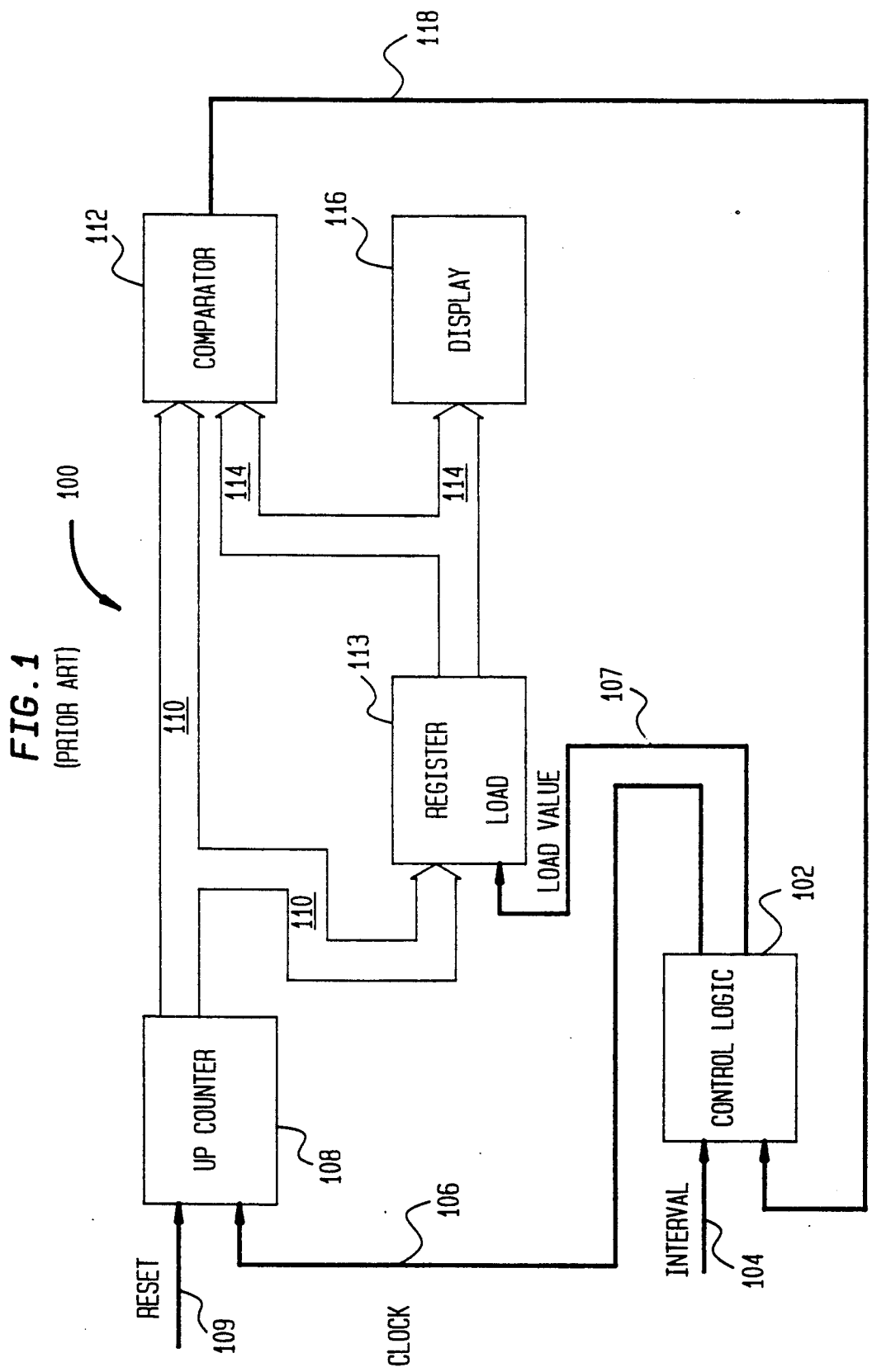
FIG. 1 is a block diagram of a prior art circuit for measuring the longest response time interval for computer system elements.
Figure 2:
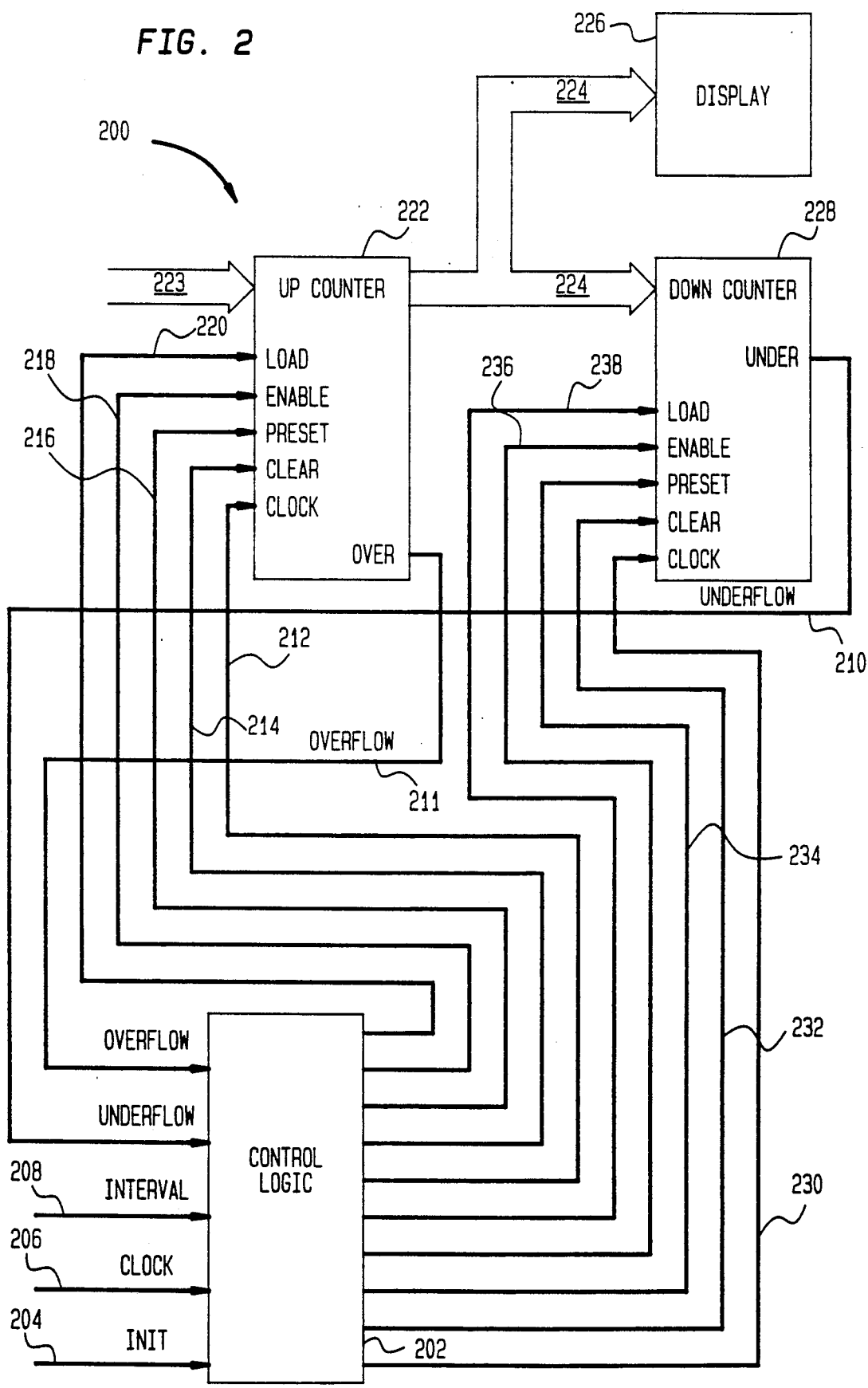
FIG. 2 is a block diagram of the preferred embodiment of the circuit of the present invention for measuring response time intervals for computer systems.

Referring to FIG. 2, the circuit of the present invention is shown generally at 200. The circuit includes control logic 202, up-counter 222, down-counter 228, and display 226. The control logic and up- and down-counters are incorporated in a PLUS 405 device commercially available from Signetics, Inc., Orem, Utah. The counters may be binary or BCD counters. The display is a hexadecimal seven segment display. The interconnections of these circuit elements will now be described.

Control logic 202 has five inputs. The first input is the INIT signal on line 204 which is the signal to initialize the circuit for measuring the longest or shortest response time interval. The second input to control logic 202 is the CLOCK signal on line 206. This signal is used to increment up-counter 222, decrement down-counter 228, and generally synchronize operation of the circuit elements. The third signal input to control logic 202 is the INTERVAL signal on line 208. This signal is asserted when a response time interval begins and de-asserted when a response time interval ends. The fourth signal input to the control logic is the UNDERFLOW signal on line 210 which indicates to the control logic that the down-counter has underflowed and certain actions must be performed. The fifth signal that is input to the control logic is the OVERFLOW signal on line 211: This signal indicates to the control logic that up-counter 222 has reached its maximum count value.

Control logic 202 has ten outputs. Five are for the control and operation of up-counter 222, and the remaining five are for the control and operation of down-counter 228. The first five outputs of control logic 202 are input to up-counter 222. The first output is the CLOCK signal on line 212 that is used for incrementing the up-counter. The second output is the CLEAR signal on line 214 that is used for clearing the up-counter. The third output is the PRESET signal on line 216 for presetting a desired value in the up-counter. The fourth output is the ENABLE signal on line 218 that enables the up-counter for incrementing the count value. The fifth and last output that is input to up-counter 222 is the LOAD signal on line 220. This signal permits loading of a value into the up-counter.

The other five outputs from control logic 202, which are input to down-counter 228, are similar to those input to up-counter 222. Accordingly, the first output is the CLOCK signal on line 230 that is used for decrementing the down-counter. The second output signal is the CLEAR signal on line 232 that is used for clearing the down-counter. The third output is the PRESET signal on line 234 for presetting a desired value in the down-counter. The fourth output is the ENABLE signal on line 236 that enables the down-counter for decrementing the count value. The fifth output signal is the LOAD signal on line 238 that permits loading of a value into the down-counter.

Up-counter 222, besides receiving the inputs from control logic 202, receives the input on line 223. This line provides count values that are to be loaded into the up-counter. The value on line 223 may be provided by the computer system or an external device.

The first output from up-counter 222 on line 224 is input to display 226 and input to the data input of down-counter 228. The value that is on line 224 causes display 226 to provide a readout indicative of this value. The second output of up-counter 222 is the OVERFLOW signal on line 211 that is input to control logic 202.

The value on line 224, as stated, is input to the data input of down-counter 228. When the LOAD signal on line 238 is asserted, the down-counter loads the value on line 224.

The only output of down-counter 228 is the UNDERFLOW signal on line 210. When this signal is asserted, it results in control logic 202 taking actions to cause predetermined loading of the up- and down-counters as will be described.

Having now described the circuit of the present invention, the method of operation of that circuit for measuring the longest and shortest response time intervals will be described referring to FIGS. 2, 3, and 4.

Figure 3:
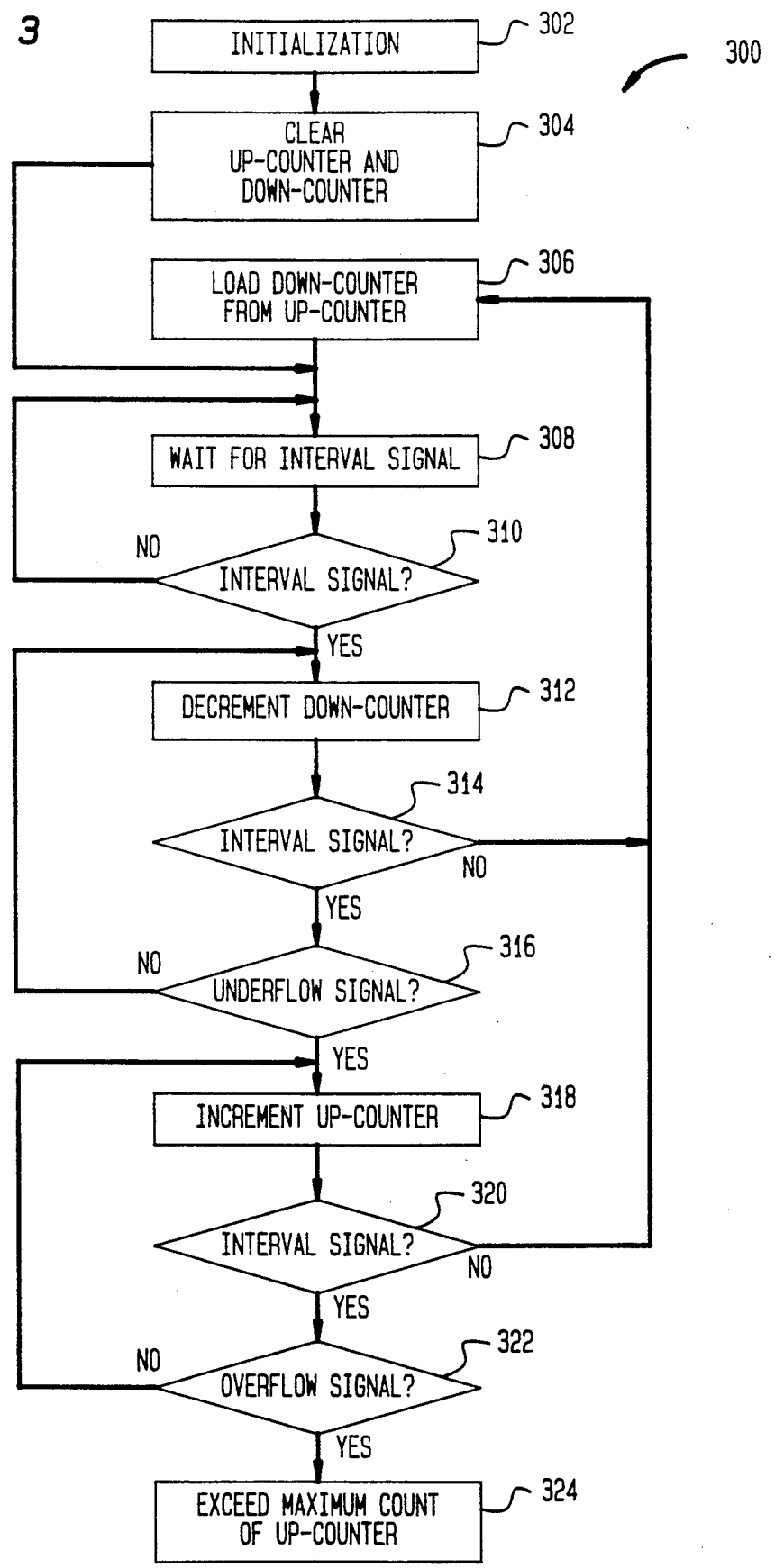
FIG. 3 is a flow diagram of the operation of the circuit shown in FIG. 2 for measuring the longest response time interval.

Referring to FIG. 3, a flow diagram for the method for measuring the longest response time interval using the circuit shown in FIG. 2 is shown generally at 300. When it is desired to determine the longest response time interval for system elements, the computer system into which the circuit of the present invention is implemented asserts the INIT signal on line 204 that is input to control logic 202. This starts the initialization step that is seen at 302. The assertion of the INIT signal causes the control logic to assert the CLEAR signals that are output on lines 214 and 232 to clear up-counter 222 and down-counter 228, respectively. This clear step is at 304.

At initialization, control logic 202 begins passing the CLOCK signal input on line 206 to up-counter 222 on line 212 and down-counter 228 on line 230. The CLOCK signal synchronizes operation of the circuit elements, and increments and decrements the up-counter and down-counter, respectively, when the ENABLE signal input to these counters is asserted. However, at initialization, the ENABLE is de-asserted.

Once the counters are cleared, the circuit of the present invention is ready to measure the longest response time interval. Accordingly, the circuit waits for the INTERVAL signal on line 208 to be asserted, as indicated at step 308, which marks the beginning of a response time interval. As shown at 310, the circuit remains in the wait condition as long as the INTERVAL signal is de-asserted. When the INTERVAL signal on line 208 is asserted, it will mean that a response time interval has begun and measurement of that interval must commence. Upon the assertion of INTERVAL signal on line 208, control logic 202 asserts the ENABLE signal on line 236 to enable down-counter 228. This permits the down-counter to decrement as set forth at step 312 based on the CLOCK signal that the down-counter receives on line 230.

As down-counter 228 decrements, control logic 202 monitors the INTERVAL signal on line 208 and the UNDERFLOW signal on line 210, as shown at 314 and 316, respectively. If during decrementing of the down-counter at step 312 the INTERVAL signal on line 208 is de-asserted, the control logic de-asserts the ENABLE signal on line 236 to the down-counter which stops the down-counter from decrementing. Control logic 202 also asserts the LOAD signal on line 238 so that the down-counter will load the value that is output from the up-counter on line 224 which is the current longest response time interval that has been measured. The loaded value overwrites the current value that is in the down-counter. This loading of the down-counter with the value that is output from the up-counter is shown at step 306.

If during decrementing of the down-counter the INTERVAL signal on line 208 is asserted and the UNDERFLOW signal on line 210 is de-asserted, the control logic will permit the down-counter to continue to decrement according to the CLOCK signal. This method of decrementing the down-counter continues as long as the INTERVAL signal is asserted and the UNDERFLOW signal remains de-asserted.

The UNDERFLOW signal on line 210 will be asserted when down-counter 228 decrements to "0." When this happens, control logic 202 de-asserts the ENABLE signal to the down-counter on line 230 and asserts the ENABLE signal on line 218 to up-counter 222. This will cause the up-counter to increment according to the CLOCK signal input to it on line 212. The incrementing step is at 318 of the flow diagram in FIG. 3.

When the circuit of the present invention performs its first measuring task, it is to be noted that both up-counter 222 and down-counter 228 contain a "0" count value. Therefore, at the first CLOCK signal cycle after the ENABLE signal is asserted, the UNDERFLOW signal that is output from the down-counter on line 210 is asserted. This causes control logic 202 to de-assert the ENABLE signal on line 230 to the down-counter and assert the ENABLE signal on line 218 to up-counter 222. The assertion of the ENABLE signal that is input to the up-counter will cause it to increment to measure the first response time interval to establish a base level from which subsequent response time intervals may be evaluated for determining the longest response time interval.

If this is not the first measuring task performed by the circuit of the present invention, down-counter 228 will have loaded in it the output of up-counter 222. As such, the down-counter will decrement until it reaches "0," and at that time, the UNDERFLOW signal will be asserted and control logic 202 will de-assert the ENABLE signal to the down-counter and assert the ENABLE signal to increment the up-counter as described, causing the up-counter to contain a new base level from which subsequent time intervals may be evaluated.

As up-counter 222 increments based on the CLOCK signal, control logic 202 monitors the INTERVAL signal on line 208 and the OVERFLOW signal on line 211, as shown in FIG. 3 at 320 and 322, respectively. If during incrementing of the up-counter at step 318 the INTERVAL signal is de-asserted, the control logic de-asserts the ENABLE signal to the up-counter. This prevents further incrementing by the up-counter. At this time, the control logic also asserts the LOAD signal on line 238 so that the down-counter loads the value that is output from the up-counter on line 224, which is the current longest measured response time interval. The loading of this value overwrites the current value in the down-counter. This loading is found at step 306.

In order for a longer response time interval to supersede the current one, that time interval must be of sufficient duration, while the INTERVAL signal is asserted, for the down-counter to decrement to "0" and the up-counter to increment at least once.

If during incrementing of the up-counter the INTERVAL signal remains asserted and the OVERFLOW signal on line 211 is asserted, it means that the maximum count of the up-counter is reached. This is shown at step 324 of the flow diagram. Once this maximum value is reached, the circuit will not count any higher and this maximum count value is displayed on display 226. To measure the longest response time interval for a computer system that reaches the maximum count value of the up-counter, the currently installed circuit of the present invention will have to be configured with up- and down-counters that have high enough count capacities to accommodate the longest response time interval for that system.

If as up-counter 222 increments the INTERVAL signal remains asserted and the OVERFLOW signal remains de-asserted, the up-counter will continue to increment based on the CLOCK signal. However, if the INTERVAL signal is de-asserted (which indicates the end of a particular response time interval) as the up-counter increments, control logic 202 de-asserts the ENABLE signal 218 that is input to the up-counter. This holds the count of the up-counter at the last incremented value. This also is the value that is output from the up-counter on line 224. Upon the de-assertion of the INTERVAL signal, the control logic asserts the LOAD signal output on line 238 that is input to down-counter 228. This loads the value on line 224 into the down-counter since this is the longest response time period at this point in time. This takes place at step 306. Accordingly, the current value in the down-counter is overwritten. At this point, the circuit returns to the wait condition at step 308 and waits for the INTERVAL signal to be asserted again to start measurement of the next response time interval.

The above method may be carried out during the entire testing period for the computer system. Throughout this testing, the current longest response time period is displayed on display 226; therefore, at the end of the testing period, the longest response time interval is displayed on display 226.

The method for measuring the shortest (minimum) response time interval will now be described referring to FIGS. 2 and 4.

Figure 4:
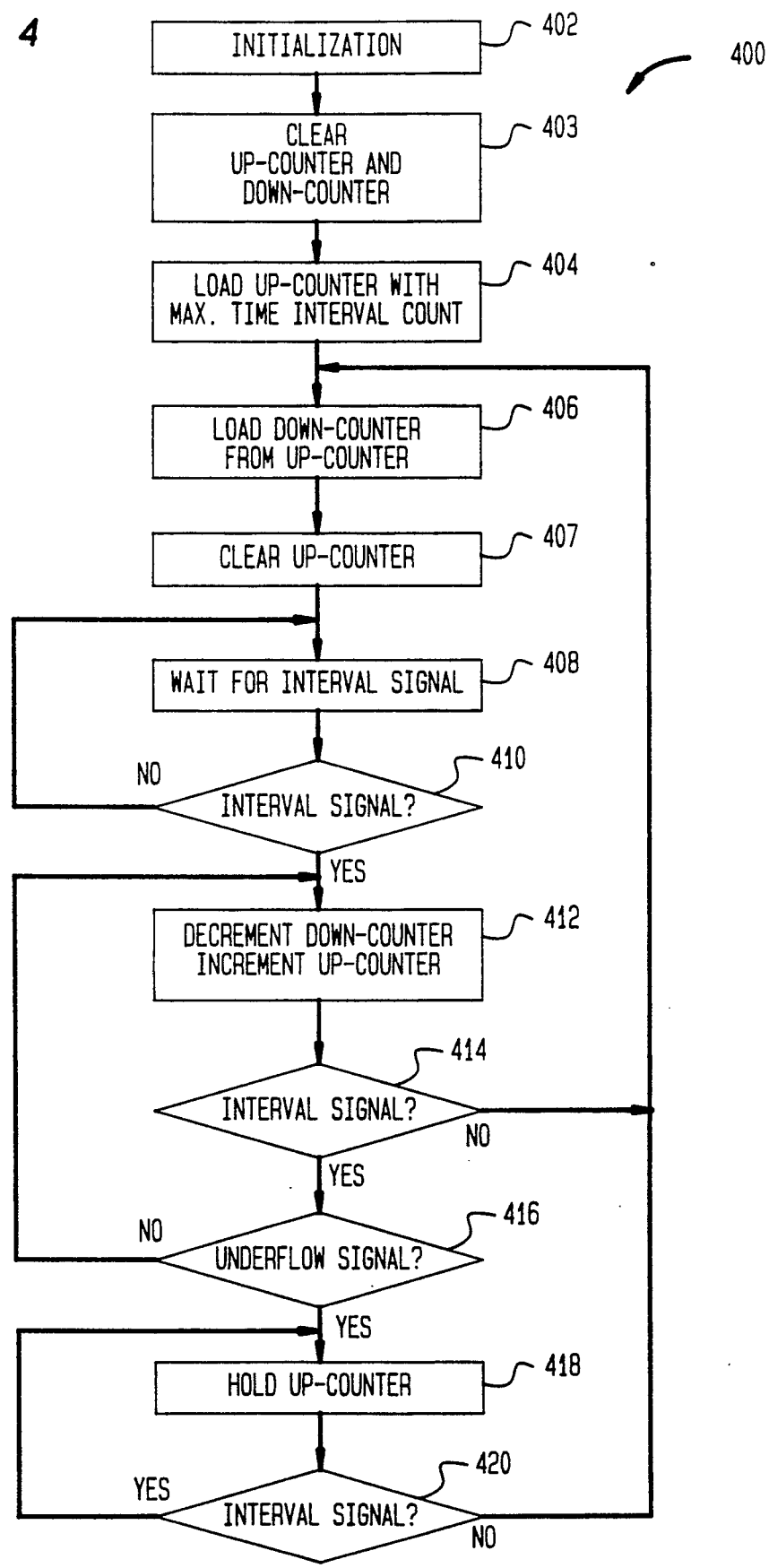
FIG. 4 is a flow diagram of the operation of the circuit shown in FIG. 2 for measuring the shortest response time interval.

Referring to FIG. 4, a flow diagram for the method for measuring the shortest response time interval is shown generally at 400. When it is desired to determine the shortest response time interval for system elements, the computer system into which the circuit of the present invention is implemented asserts the INIT signal on line 204 that is input to control logic 202. The initialization step is at 402. The assertion of the INIT signal causes the control logic to assert the CLEAR signals that are output on lines 214 and 232 to clear up-counter 222 and down-counter 228, respectively, as seen at the step at 403.

At initialization, control logic 202 begins passing the CLOCK signal input on line 206 to up-counter 222 on line 212 and down-counter 228 on line 230. This synchronizes operation of the circuit elements, and increments and decrements the up-counter and down-counter, respectively, when the ENABLE signal input to these counters is asserted. However, during the initialization step, the ENABLE signal is de-asserted.

Once the counters are cleared, it is necessary to load down-counter 228 with the longest response time interval. This is accomplished in two steps. First, control logic 202 asserts the LOAD signal and loads the longest response time interval value into the data input of up-counter 222 via input line 223. The value on line 223 may be provided by the computer system or an external device. This value is also output from the up-counter on line 224. Second, control logic 202 de-asserts the LOAD signal on line 220 that is input to up-counter 222, and asserts the LOAD signal on line 238 that is input to down-counter 228. This loads the longest response time interval into the down-counter. The loading of the up-counter is at step 404 and the loading of the down-counter from the up-counter is at step 406.

Once down-counter 228 is loaded, control logic 202 de-asserts the LOAD signal on line 238 and asserts the CLEAR signal on line 214 to clear up-counter 222 as shown at step 407. At this point, the circuit of the present invention is ready to measure the shortest response time interval. Accordingly, the circuit waits for the INTERVAL signal on line 208 to be asserted, as indicated at step 408, which marks the beginning of a response time interval. Similar to what was described with respect to step 308 in FIG. 3, while the circuit waits at step 408, the control logic monitors the INTERVAL signal on line 208. As shown at 410, the circuit remains in the wait condition as long as the INTERVAL signal is de-asserted. When the INTERVAL signal on line 208 is asserted, it means that a response time interval has begun and measurement of that interval must commence. Upon the assertion of the INTERVAL signal on line 208, control logic 202 asserts the ENABLE signal on line 218 to enable up-counter 222 and the ENABLE signal on line 236 to enable down-counter 228. This permits the up-counter to increment and the down-counter to decrement based on the CLOCK signal that the up-counter receives on line 212 and the down-counter receives on line 230.

As up-counter 222 increments and down-counter 228 decrements as shown at step 412, control logic 202 monitors the INTERVAL signal on line 208 and the UNDERFLOW signal on line 210, as shown at 414 and 416, respectively. If the INTERVAL signal is de-asserted, the control logic de-asserts the ENABLE signal on line 218 to up-counter 222 and the ENABLE signal on line 236 to the down-counter which stops the up-counter from incrementing and the down-counter from decrementing. At this time, control logic 202 also asserts the LOAD signal on line 38 so that the down-counter will load the value that is output from the up-counter on line 224, which is the current shortest response time interval that has been measured.

If the down-counter has not decremented to "0" when the INTERVAL signal is de-asserted, it means that the time interval just measured is the new shortest response time interval to be measured. Further, this count value is loaded into the down-counter from the up-counter. This loading of the down-counter with the value that is output from the up-counter is indicated at step 406.

Once the down-counter is loaded, control logic 202 de-asserts the LOAD signal on line 238 to the down-counter and asserts the CLEAR signal on line 214 to clear the up-counter. The circuit of the present invention now waits for the INTERVAL signal on line 208 to be asserted again to indicate the start of the next response time interval to be measured, as shown at step 408.

If during the incrementing and decrementing step at 412, the INTERVAL signal on line 208 is asserted and the UNDERFLOW signal on line 210 is de-asserted, the control logic will permit the up-counter and down-counter to continue to increment and decrement, respectively, according to the CLOCK signal. This method of incrementing the up-counter and decrementing the down-counter continues as long as the INTERVAL signal is asserted and the UNDERFLOW signal remains de-asserted.

The UNDERFLOW signal on line 210 will be asserted when down-counter 228 decrements "0." At this time, control logic 202 de-asserts the ENABLE signal on line 218 to up-counter 222 and the ENABLE signal on line 230 to the down-counter. This will hold the count value in the up-counter, as shown at step 418. The count value is held because the response time interval currently being measure is equal to, or longer than, the shortest measured response time interval value up to that point in time.

After de-asserting the ENABLE signals to hold the count value that is in up-counter, control logic 202 continues to monitor the INTERVAL signal, as shown at 420 of FIG. 4. If the INTERVAL signal remains asserted, the circuit of the present invention will continue holding the up-counter count value. If, however, the INTERVAL signal is de-asserted, indicating the end of the response time interval currently being measured, control logic 202 asserts the LOAD signal on line 238 so that the down-counter will load the value that is output from the up-counter on line 224 which is the current shortest response time interval that has been measured. This loading of the down-counter with the value that is output from the up-counter is indicated at step 406.

Once the down-counter is loaded, control logic 202 de-asserts the LOAD signal on line 238 to the down-counter and asserts the CLEAR signal on line 214 to the up-counter. The circuit of the present invention now waits for the INTERVAL signal on line 208 to be asserted again to indicate the start of the next response time interval to be measured, as shown at step 408.

When the circuit of the present invention operating according to FIG. 4 performs its first measuring task, it is to be noted that up-counter 222 contains a "0" count value and down-counter 228 contains the maximum response time interval count value. Therefore, from the first CLOCK signal cycle after the ENABLE signal is asserted, the up-counter begins incrementing from "0" and down-counter begin decrementing from the maximum response time interval count value.

The UNDERFLOW signal that is output from the down-counter on line 210 is not asserted until the down-counter decrements the equivalent of the maximum response time interval count value without the INTERVAL signal being de-asserted. If this happens, the up-counter will have incremented to the maximum response time interval count value. This will cause the circuit of the present invention to hold the count value in up-counter because whatever the count value of the response time interval being measured is, it will be equal to, or longer than, the maximum response time interval count value that was loaded into the down-counter, not shorter which is of interest.

If the down-counter does not reach a "0" count value when the INTERVAL signal is de-asserted, it will mean that the count value in the up-counter (which is equal to the amount that the down-counter decrements) is shorter than the maximum response time interval count value that was initially loaded into the down-counter. This new shortest response interval circuit value is used as the base level from which subsequent response time intervals may be evaluated.

If this is not the first measuring task performed by the circuit of the present invention, down-counter 228 will have loaded into it the output of up-counter 222 which in all likelihood will be a count value that is less than the maximum response time interval count value. So, from the first CLOCK signal cycle following the up- and down-counters being enabled by the ENABLE signal, the up-counter will increment for a "0" count value, while the down-counter will decrement from the current shortest response time interval count value that has been measured. As explained before, if the length of the response the interval is less than value loaded in the down-counter, it will establish a new current shortest response time interval count value from which subsequent response time intervals may be evaluated. However, if the measured response time interval is equal to, or greater than, the count value loaded in the down-counter, the current shortest response time interval that was previously loaded into the down-counter will remain the standard for evaluating subsequent response time intervals.

This process is continued during the testing period to determine the shortest response time period. During the testing period display 226 will display the current shortest response time interval, with the last displayed value being the shortest one for the system elements.

It is to be understood that the circuit of the present invention may be used to measure any desired response time interval that may be between the maximum and minimum response time intervals. Moreover, the circuit of the present invention is not limited to use with computer systems, it may be used with other types of systems, for example, for measuring timing associated with television systems, as an automobile timing circuit, etc.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A circuit for measuring predetermined types of time intervals associated with a system, comprising:
   control logic for controlling operation of the circuit;
   an up-counter that increments based on signals received from the control logic;
   a down-counter having an input connected to an output of the up-counter, the down-counter decrements from a value loaded in the down-counter based on signals received from the control logic, with a predetermined signal output from the down-counter for causing the control logic to output the signals to the up-counter; and
   display means for displaying an output of the up-counter representative of a measured length of a predetermined type of time interval.

2. The circuit as recited in claim 1, wherein the control logic outputs a clock signal to the up-counter and the down-counter to synchronize operation of the up-counter, down-counter, and control logic.

3. The circuit as recited in claim 2, wherein the clock signal output from the control logic increments the up-counter when the up-counter is enabled and decrements the down-counter when the down-counter is enabled.

4. The circuit as recited in claim 3, wherein an underflow signal output by the down-counter when its count equals "0" causes the control logic to enable the up-counter to increment.

5. The circuit as recited in claim 1, wherein the down-counter loads a count value output from the data output of the up-counter when the control logic receives predetermined signals.

6. The circuit as recited in claim 5, wherein the down-counter loads the count value output from the data output of the up-counter after the control logic receives a signal indicative of an end of the time interval being measured.

7. The circuit as recited in claim 1, wherein the display means displays a count value output from the data output of the up-counter.

8. The circuit as recited in claim 1, wherein the up- and down-counters are binary counters.

9. The circuit as recited in claim 1, wherein the up- and down-counters are BCD counters.

10. The circuit as recited in claim 1, wherein the circuit measures a maximum time interval for elements of computer system to respond to a request for data of information.

11. The circuit as recited in claim 1, wherein the circuit measures a minimum time interval for elements of computer system to respond to a request for data of information.

12. A circuit for measuring a maximum time interval for elements of a system to respond to a request for data or information, comprising:
control logic for controlling operation of the circuit;
an up-counter that increments based on signals received from the control logic and contains a running maximum measured response time interval value;
a down-counter that decrements from a running maximum measured response time interval value loaded in the down-counter at an end of each measured response time interval based on signals received from the control logic; and
display means for displaying the running maximum measured response time interval value that is output from the up-counter.

13. The circuit as recited in claim 12, wherein the down-counter outputs a signal to trigger the control logic to output a signal to enable the up-counter to increment.

14. The circuit as recited in claim 13, wherein the down-counter outputs the signal to trigger the control logic when the down-counter decrements to "0."

15. The circuit as recited in claim 12, wherein the control logic outputs a clock signal to the up-counter and the down-counter to synchronize operation of the up-counter, down-counter, and control logic.

16. The circuit as recited in claim 15, wherein the clock signal output from the control logic increments the up-counter when the up-counter is enabled and decrements the down-counter when the down-counter is enabled.

17. The circuit as recited in claim 12, wherein a data input of the down-counter is connected to a data output of the up-counter.

18. The circuit as recited in claim 17, wherein the down-counter loads a count value output from the data output of the up-counter when the control logic receives predetermined signals.

19. The circuit as recited in claim 18, wherein the down-counter loads the count value output from the data output of the up-counter after the control logic receives a signal indicative of an end of the measured response time interval being measured.

20. The circuit as recited in claim 18, wherein display means displays the count value output from the data output of the up-counter.

21. The circuit as recited in claim 12, wherein the up- and down-counters are binary counters.

22. The circuit as recited in claim 12, wherein the up- and down-counters are BCD counters.

23. A circuit for measuring a minimum time interval for elements of a system to respond to a request for data or information, comprising:
control logic for controlling operation of the circuit;
an up-counter that increments from a "0" count value to measure each response time interval based on signals received from the control logic;
a down-counter that decrements from a running minimum measured response time interval value loaded in the down-counter at an end of each measured response time interval based on signals received from the control logic; and
display means for the displaying a count value output from the up-counter that is a running minimum measured response time interval.

24. The circuit as recited in claim 23, wherein the down-counter outputs a signal to trigger the control logic to output a signal to disable the up-counter from incrementing.

25. The circuit as recited in claim 24, wherein the down-counter outputs the signal to trigger the control logic when the down-counter decrements to 26. The circuit as recited in claim 23, wherein the control logic outputs a clock signal to the up-counter and the down-counter to synchronize operation of the up-counter, down-counter, and control logic.

27. The circuit as recited in claim 26, wherein the clock signal output from the control logic increments the up-counter when the up-counter is enabled and decrements the down-counter when it is enabled.

28. The circuit as recited in claim 23, wherein a data input of the down-counter is connected to a data output of the up-counter.

29. The circuit as recited in claim 28, wherein the down-counter loads a count value output from the data output of the up-counter when the control logic receives predetermined signals.

30. The circuit as recited in claim 29, wherein the down-counter loads the count value output from the data output of the up-counter when the control logic receives a signal indicative of an end of the measured response time interval being measured.

31. The circuit as recited in claim 29, wherein the display means displays the count value output from the data output of the up-counter.

32. The circuit as recited in claim 23, wherein the up- and down-counters are binary counters.

33. The circuit as recited in claim 23, wherein the up- and down-counters are BCD counters.

34. A method for measuring and displaying a maximum time interval for elements of a system to respond to requests for data or information with a circuit that includes control logic, an up-counter, a down-counter, and a display, comprising the steps of:
- (A) loading into the down-counter a time interval measurement count value present in the up-counter;
- (B) monitoring a state of a first signal to determine when to move to step (C), and accordingly repeating step (B) if the first signal is de-asserted and moving to step (C) if the first signal is asserted;
- (C) decrementing the down-counter based on a second signal that is output from the control logic;
- (D) monitoring the state of the first signal to determine whether to move to step (B) or (E), and accordingly moving to step (B) if the first signal is de-asserted and moving to step (E) if the first signal is asserted;
- (E) monitoring a state of a third signal to determine whether to move to step (C) or (F), and accordingly moving to step (C) if the third signal is de-asserted and moving to step (F) if the third signal is asserted;
- (F) incrementing the up-counter based on the second signal that is output from the control logic;
- (G) monitoring the state of the first signal to determine whether to move to step (A) or (F), and accordingly moving to step (A) if the first signal is de-asserted and moving to step (F) if the first signal is asserted; and
- (H) displaying on display means a count value output from the up-counter.

35. The method as recited in claim 34, wherein the first signal is a signal that indicates a beginning of a response time interval to be measured when it is asserted and an end of the response time interval when it is de-asserted.

36. The method as recited in claim 34, wherein the second signal is clock signal.

37. The method as recited in claim 34, wherein the third signal is an underflow signal that indicates a count value of the down-counter is at "0."

38. The method as recited in claim 34, wherein the method further comprises a step after step [G] of checking a state of a fourth signal to determine whether to move to step (F) or (I), and accordingly moving to step (F) if the fourth signal is de-asserted and moving to step (I) if the fourth signal is asserted, with step (I) being where the up-counter indicates a maximum count value of the up-counter is reached.

39. The method as recited in claim 38, wherein the fourth signal is an overflow signal.

40. A method for measuring and displaying a minimum time interval for elements of a system to respond to a request for data or information with a circuit that includes control logic, an up-counter, a down-counter, and a display, comprising the steps of:
- (A) loading a time interval count value in the up-counter in the down-counter;
- (B) clearing the up-counter;
- (C) monitoring a state of a first signal to determine when to move to step (D), and accordingly repeating step (C) if the first signal is de-asserted and moving to step (D) if the first signal is asserted;
- (D) decrementing the down-counter and incrementing the up-counter based on a second signal that is output from the control logic;
- (E) monitoring the state of the first signal to determine whether to move to step (A) or (F), and accordingly moving to step (A) if the first signal is de-asserted and moving to step (F) if the first signal is asserted;
- (F) monitoring a state of a third signal to determine whether to move to step (D) or (G), and accordingly moving to step (D) if the third signal is de-asserted and moving to step (G) if the third signal is asserted;
- (G) holding the count value in the up-counter;
- (H) monitoring the state of the first signal to determine whether to move to step (A) or (G), and accordingly moving to step (A) if the first signal is de-asserted and moving to step (G) if the first signal is asserted; and
- (I) displaying on display means a count value output from the up-counter.

41. The method as recited in claim 40, wherein the first signal is a signal that indicates a beginning of a response time interval to be measured when it is asserted and an end of the response time interval when it is de-asserted.

42. The method as recited in claim 40, wherein the second signal is clock signal.

43. The method as recited in claim 40, wherein the third signal is an underflow signal that indicates a count value of the down-counter is at "0."

44. The method as recited in claim 40, wherein before step (A) the up-counter is loaded with a maximum response time interval count value.

* * * * *